(12) United States Patent
Magnus

(10) Patent No.: US 10,371,280 B2
(45) Date of Patent: Aug. 6, 2019

(54) ACTUATOR FOR A VALVE

(71) Applicant: FMC Kongsberg Subsea AS, Kongsberg (NO)

(72) Inventor: Heyn Halfdan Magnus, Kongsberg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 15/026,242

(22) PCT Filed: Sep. 30, 2014

(86) PCT No.: PCT/EP2014/070873
§ 371 (c)(1),
(2) Date: Mar. 30, 2016

(87) PCT Pub. No.: WO2015/044441
PCT Pub. Date: Apr. 2, 2015

(65) Prior Publication Data
US 2016/0245425 A1 Aug. 25, 2016

(30) Foreign Application Priority Data
Sep. 30, 2013 (NO) .................................... 20131304

(51) Int. Cl.
*F16K 31/00* (2006.01)
*F16K 31/122* (2006.01)
(Continued)

(52) U.S. Cl.
CPC ...... *F16K 31/1221* (2013.01); *E21B 33/0355* (2013.01); *E21B 34/04* (2013.01); *F15B 15/1423* (2013.01)

(58) Field of Classification Search
CPC ............. F16K 31/1221; F15B 15/1423; E21B 33/0355; E21B 34/04
(Continued)

(56) References Cited

U.S. PATENT DOCUMENTS 3,572,032 A * 3/1971 Terry ...................... B63C 11/52
60/398
3,677,001 A * 7/1972 Childers ............. E21B 33/0355
137/236.1
(Continued)

FOREIGN PATENT DOCUMENTS

EP 1 209 394 A2 5/2002
GB 2 337 065 A 11/1999
(Continued)

*Primary Examiner* — Umashankar Venkatesan

(57) ABSTRACT

The following invention relates to an actuator for controlling a valve (100) in a subsea installation, the valve having a spring (108) to return the valve to a failsafe condition upon loss of pressure. The actuator comprises an actuator module (10) that is exchangeably connected to the valve and comprising a cylinder with a movable piston (14), the piston being mechanically connected to said valve element, a fluid pump (47) operatively connected to said hydraulic cylinder, said pump adapted to supply fluid through a first hydraulic line (36) operatively connected between said hydraulic cylinder and said pump, said hydraulic line supplying a sufficient pressure to move the piston to said second position to cause the valve element to move to its second position, and a second hydraulic line (48) providing a fluid passage between the first hydraulic line and a reservoir (44) whereby a bypass control unit (39) is located in said second hydraulic line and comprising a movable element operating to open or close said fluid passage through the second hydraulic line providing a failsafe function to the valve. According to the invention a third hydraulic line (49) is connected to the
(Continued)

second hydraulic line and acting on the movable element, forcing the control unit towards opening said passage.

19 Claims, 3 Drawing Sheets

(51) Int. Cl.
*E21B 33/035* (2006.01)
*E21B 34/04* (2006.01)
*F15B 15/14* (2006.01)

(58) Field of Classification Search
USPC .......................................................... 251/63.6
See application file for complete search history.

(56) References Cited

U.S. PATENT DOCUMENTS

| | | | | |
|---|---|---|---|---|
| 3,933,338 A | * | 1/1976 | Herd | F16K 31/1225 251/63.6 |
| RE30,115 E | * | 10/1979 | Herd | F16K 31/1225 137/236.1 |
| 4,294,284 A | * | 10/1981 | Herd | E21B 34/04 137/236.1 |
| 4,565,349 A | * | 1/1986 | Tomlin | E21B 33/0355 251/29 |
| 6,269,874 B1 | | 8/2001 | Rawson et al. | |
| 2008/0264646 A1 | * | 10/2008 | Sten-Halvorsen | E21B 33/0355 166/360 |
| 2010/0163767 A1 | * | 7/2010 | Meinhof | F16K 31/1221 251/129.01 |

FOREIGN PATENT DOCUMENTS

| | | |
|---|---|---|
| WO | WO 2006/068873 A1 | 6/2006 |
| WO | WO 2012/122159 A2 | 9/2012 |

* cited by examiner

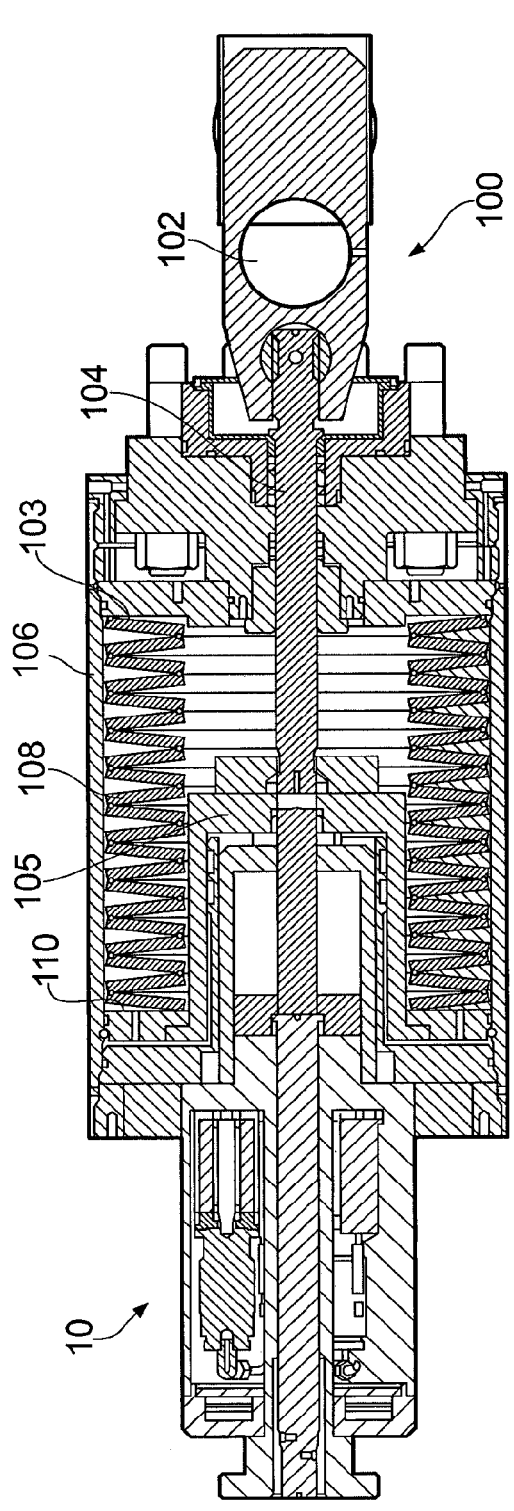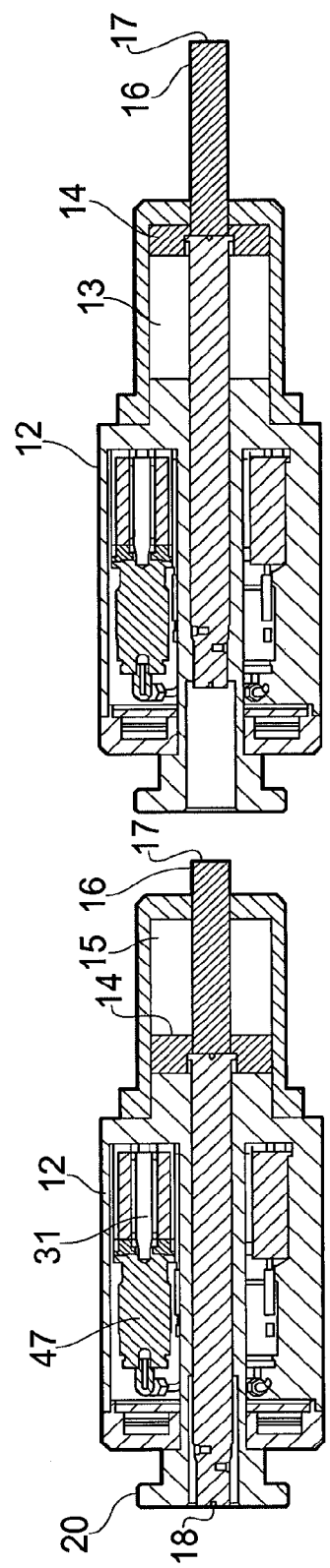
FIG. 1
FIG. 2
FIG. 3

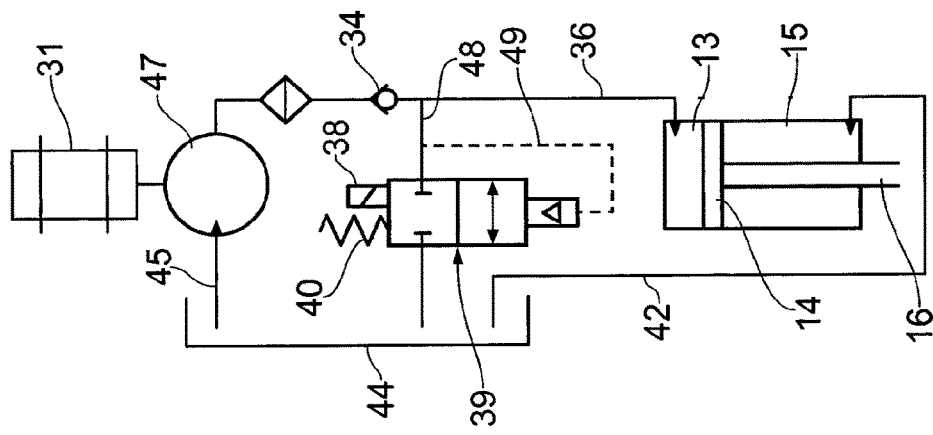
FIG. 4
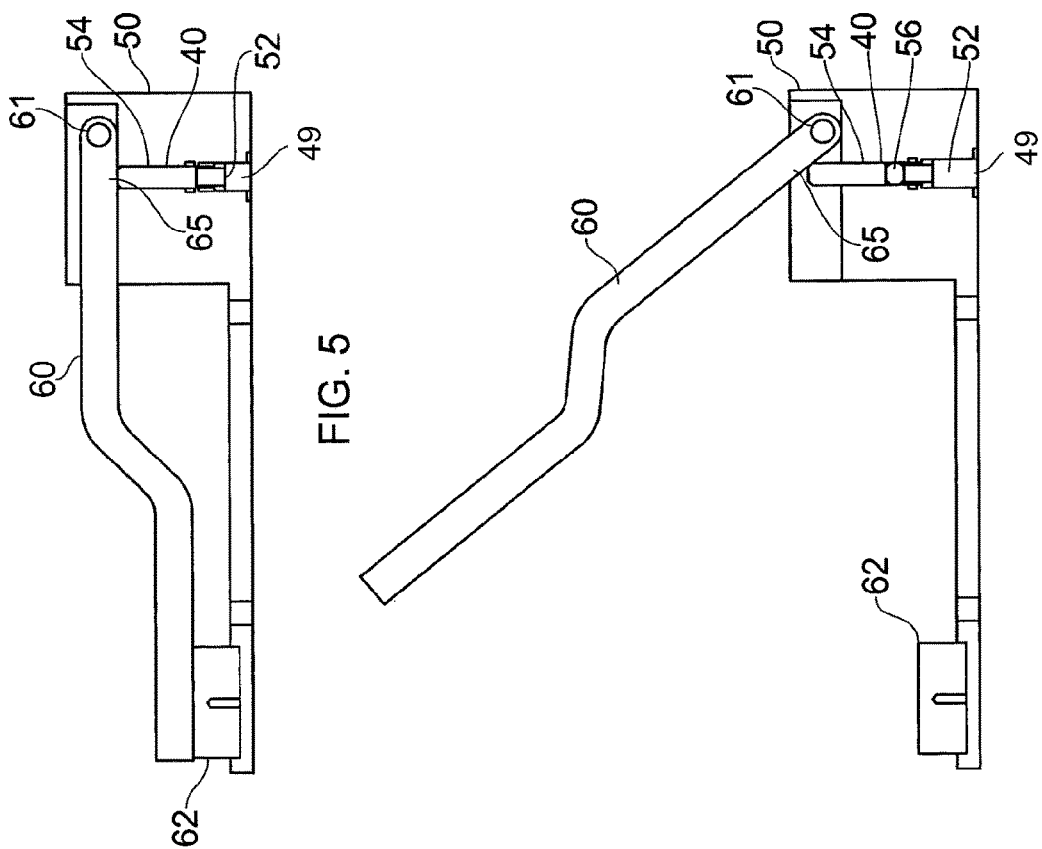
FIG. 5
FIG. 6

ACTUATOR FOR A VALVE

The following invention relates to an actuator for a valve in a subsea installation.

BACKGROUND OF THE INVENTION

The production from a subsea well is controlled by a number of valves that are assembled into a Christmas tree. The actuation of the valves is normally dependent upon hydraulic fluid to operate hydraulic actuators for the valves and is therefore entirely dependent upon an external source for the supply of the hydraulic fluid. Hydraulic fluid is normally supplied through an umbilical running from a station located on a vessel on the surface or, less commonly, from a land based station. Usually the actuators are controlled by pilot valves housed in a control module located at or near the subsea installation. The pilot valves direct the supply of fluid to each actuator, as dictated by the need for operation. The pilot valves may be operated by electric means, and such a system is therefore called an electrohydraulic system.

The design of actuators and valves for subsea wells is dictated by stringent demands on the standard and function for these valves because of the dangers of uncontrolled release of hydrocarbons. A typical demand is that these valves must be failsafe closed, meaning that they must close upon loss of power or control. The only practical means today in subsea environments is to use springs that are held in the compressed state by the hydraulic pressure, keeping the valve open, and are released in the event of loss of hydraulic pressure, thus closing the valve. The spring force needed to close a valve is dependent on both the well pressure and the ambient pressure, with larger ambient pressure demanding larger springs.

For the control of subsea wells, a connection between the well and a monitoring and control station must be established. This station can either be located in a floating vessel near the subsea installation or in a land station a long distance away. Communication between the control station and the subsea installation is normally provided by installing an umbilical between the two points. The umbilical contains lines for the supply of hydraulic fluid to the various actuators in or by the well, electric lines for the supply of electric power and signals to various monitoring and control devices, and lines for signals to pass to and from the well. This umbilical is a very complicated and expensive item, costing several thousand dollars per meter.

It would therefore be very cost-saving to be able to eliminate the umbilical. In the invention, the standard hydraulic lines can be eliminated while maintaining the standard hydraulic spring-operated failsafe system.

European Patent application No. 1209394 discloses an electro-hydraulic control unit with a piston/cylinder arrangement in which the piston divides the cylinder into two chambers, a fluid connection between the two chambers, and a valve to configure the fluid flow such that pressurized hydraulic fluid may only flow in one direction and not in two directions.

U.S. Pat. No. 6,269,874 discloses an electro-hydraulic surface controlled subsurface safety valve actuator that comprises an electrically actuated pressure pump and a dump valve that is normally open so that if power fails, the pressure is released and the safety valve closes.

An electro-hydraulic actuator similar to the present invention is also known that comprises a pump unit that supplies hydraulic fluid under pressure to a piston so as to move the valve to its open position. The actuator is intended to be fitted to an existing valve. In this disclosed actuator, the failsafe function is provided by a two-way valve that is located in a bypass fluid line connecting one side of the piston with a drain accumulator. The two-way valve is fitted with a solenoid that closes the bypass line and a spring that biases the two-way valve towards a position where fluid can flow through the bypass line. Upon loss of power to the solenoid, the spring will force the two-way valve to open the bypass passage. The solenoid must therefore be strong enough to withstand the force of the spring. Also, the spring must be strong enough to force the valve open against the pressure in the line. This pressure can be very high, especially in systems located at great depths.

The object of the present invention is to provide a smaller and more compact actuator that can be releasably fitted to the valve and which overcomes the disadvantages related to the prior art.

A further objective of the invention is to provide an actuator that overcomes the shortcomings identified above.

The invention is set forth in the independent claim 1, while the dependent claims define other characteristics of the invention.

SUMMARY OF THE INVENTION

The present invention relates to an actuator comprising a bypass control unit providing a failsafe function to a valve, wherein a fluid in a hydraulic line acts on the movable element in the bypass control unit, forcing the control unit towards opening a passage to drain the fluid in the actuator and thereby enable a valve spring to close the valve.

An actuator for a valve is provided which is suitable for use in a subsea installation, the valve having a valve element that is movable between a first position and a second position and a spring that biases the valve element to the first position, the actuator comprising an exchangeable actuator module comprising a hydraulic cylinder with a movable piston, the piston being mechanically connectable to said valve element, a fluid pump operatively connected to said hydraulic cylinder, said fluid pump being adapted to supply fluid through a first hydraulic line which is operatively connected between said hydraulic cylinder and said fluid pump, said first hydraulic line supplying a sufficient pressure to move the piston to cause the valve element to move to the second position, a reservoir for storing a quantity of hydraulic supply fluid, said fluid in said hydraulic fluid supply reservoir having a pressure that is less than said sufficient pressure, a second hydraulic line providing a fluid passage between the first hydraulic line and said hydraulic fluid supply reservoir, a bypass control unit located in said second hydraulic line and having a movable element operating to open or close said fluid passage and provide a failsafe function to the valve, first and second force generating means, both of which bias the movable element to close the fluid passage, and a third force generating means which biases the movable element to open the fluid passage.

In an embodiment of the invention, during use of the actuator the third force generating means is a pressurized fluid.

According to an aspect of the invention, the first force generating means is a solenoid, optionally in combination with a lever.

According to an aspect of the invention, the second force generating means is a spring.

In an aspect of the invention, the movable element is a piston arranged in a casing.

In an embodiment of the invention, a seal is arranged at a circumference of the piston when the fluid passage is closed, and a retainer element is arranged within the casing to retain the seal in place when the fluid passage is open. The retainer element may be arranged to follow the movements of the piston, e.g., by being fixed to the piston or being pre-tensioned by a spring or similar means.

In an embodiment of the invention, the retainer element abuts the piston when the fluid passage is closed and follows the movements of the piston until a stop element on the retainer element comes into contact with a stop surface in the casing. In this embodiment, the fluid passage comprises an axial gap formed between the retainer element and the piston, and the fluid passage extends through the axial gap to an outlet in the casing.

In an aspect of the invention, the retainer element abuts the piston when the fluid passage is closed and is adapted to follow the movements of the piston, and the retainer element is formed with at least one radial through-going opening forming a part of the fluid passage when the fluid passage is open.

The second force generating means may in an aspect of the invention be configured to apply a force on the movable element which is greater than the force applied by the first force generating means on the movable element.

A third hydraulic line may be connected to the second hydraulic line and act on the movable element to force the bypass control unit towards opening said fluid passage.

The control unit may comprise a permanent magnet which is adapted to apply a force that overrides the force of the first and second force generating means, thereby forcing the fluid passage open.

More specifically, the present invention relates to an actuator for a valve in a subsea installation, the valve having a valve element that is movable between a first position and a second position and a spring biasing that biases the valve element to the first position, the actuator comprising an exchangeable actuator module comprising a cylinder with a movable piston, the piston being mechanically connectable to said valve element, a fluid pump operatively connected to said hydraulic cylinder, said fluid pump being adapted to supply fluid through a first hydraulic line which is operatively connected between said hydraulic cylinder and said fluid pump, said first hydraulic line supplying a sufficient pressure to move the piston to cause the valve element to move to the second position, a reservoir for storing a quantity of hydraulic supply fluid, said fluid in said hydraulic fluid supply reservoir having a pressure that is less than said sufficient pressure, a second hydraulic line providing a fluid passage between the first hydraulic line and said hydraulic fluid supply reservoir, a bypass control unit located in said second hydraulic line and having a movable element operating to open or close said fluid passage and provide a failsafe function to the valve, wherein a third hydraulic line is connected to the second hydraulic line and acts on the movable element, forcing the bypass control unit towards opening said fluid passage.

In an aspect of the invention the bypass control unit may be a two-way valve. The two-way valve may comprise a spring which is adapted to move the movable element to close the fluid passage. The force of the spring is preferably less than the force of fluid acting on the movable element.

The bypass control unit may in an aspect of the invention comprise a solenoid for holding the moveable element in a position to close the fluid passage. The control unit, in the form of the two-way valve comprising the movable element, may have pressurized hydraulic fluid acting on one side of the movable element. The spring, the solenoid, and/or a combination of the spring and the solenoid may act on the other side of the movable element. The spring may be calibrated to have a force that is a little less than the force of the fluid acting on the other side. The solenoid can therefore be made such that its holding power may be small.

In an embodiment of the invention the bypass control unit may comprise a lever that on one side is hinged to a block containing the fluid passage and on the other side is held by an electro-magnet. By positioning the lever such that the movable element acts on a fulcrum system the holding force of the magnet can again be very small. Further, in a first position, the lever acts on the movable element to close the fluid passage and, in a second position, the lever enables the pressure in the third hydraulic line to move the movable element to open the fluid passage.

In an aspect of the invention, the lever may be held in the first position by an electro-magnet.

In an aspect of the invention, the fluid pump may be driven by an electric motor.

In an aspect of the invention, the piston may be releasably connected to the valve element.

The actuator may further comprise a one-way valve arranged in said first hydraulic line to enable fluid to flow in only one direction from the fluid pump to the cylinder.

In yet another aspect of the invention the actuator may further comprise a fourth fluid line connecting said hydraulic fluid supply reservoir to the pump.

In an embodiment of the invention, the actuator is a module that can releasably connected to the valve.

In an aspect of the invention, the actuator comprises a fluid line connecting said fluid supply reservoir with the pump.

It is obvious for the person skilled in the art that the different features in the different aspects or embodiments may be combined in any way.

BRIEF DESCRIPTION OF THE DRAWINGS

The invention will now be described in a non-limiting embodiment, with reference to the accompanying drawings, wherein:

FIG. 1 is a drawing of the valve and actuator module of the present invention;

FIG. 2 is a drawing showing the detachable actuator module in the first position;

FIG. 3 is a drawing showing the detachable actuator module in the second position;

FIG. 4 is a schematic fluid diagram illustrating the fail-safe function of the actuator;

FIG. 5 is a drawing of an embodiment of a fail-safe mechanism in the second position;

FIG. 6 is a drawing of the embodiment of the fail-safe mechanism of FIG. 5 in the first position.

DETAILED DESCRIPTION OF THE INVENTION

Figure 7:
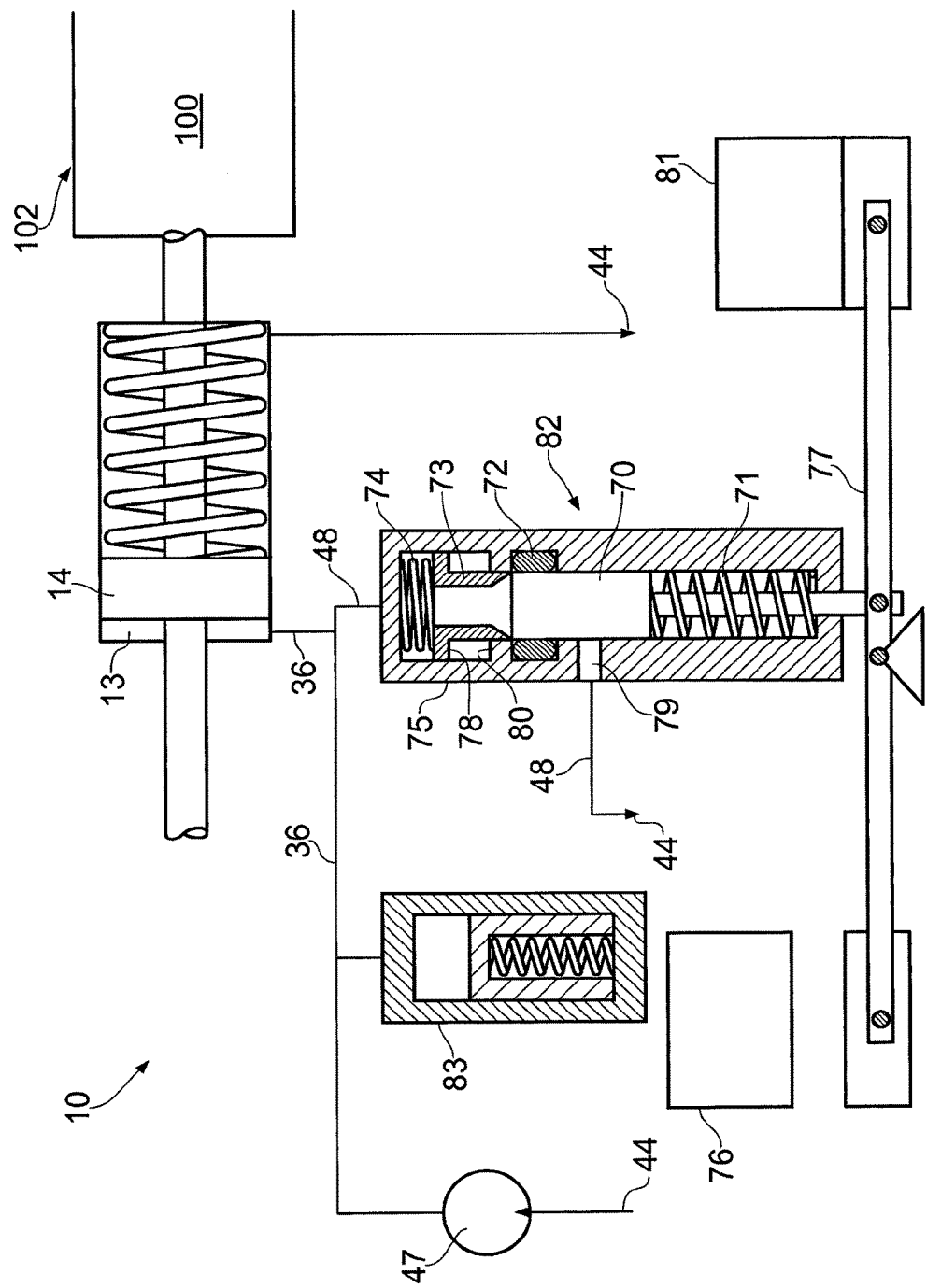
FIG. 7 is a drawing of a second embodiment of the invention.

In FIG. 1 is shown a valve 100 to be operated by the actuator 10 of one embodiment of the present invention. The valve 100 has a valve element 102 which is connected to a valve stem 104 that extends into and through a spring housing 106. A spring 108 is located in the spring housing 106 between an end plate 103 and a movable spring actuating flange 110. The valve stem 104 extends into the spring housing 106 through the end plate 103 and is rigidly attached to the spring actuating flange 110. At this attachment point the spring actuating flange 110 has a recess 105 for the actuator 10. As can be understood from FIG. 1, when the spring actuating flange 110 is moved to the right, the spring 108 will be compressed and at the same time the movement of the valve stem 104 will cause the valve element 102 to move to its open position.

The actuator 10 is shown in FIGS. 2 and 3. The actuator 10 comprises a housing 12 which includes a portion that defines a cylinder 12a. A piston 14 is axially movable in the cylinder 12a between a first position and a second position. A stem 16 is attached to the piston 14 and extends through the housing 12. The stem 16 has a first end 17 that connects into the recess 105 and a second end 18 with a linear override tool 20 which is used for manually moving the stem 16, e.g. using an ROV tool. The whole actuator 10 can be locked into the valve housing.

The piston 14 includes seals to seal the piston 14 against the cylinder 12a, as is well known in the art. The piston 14 defines first 13 (FIG. 3) and second 15 (FIG. 2) chambers in the housing. The housing 12 further contains a pump unit comprising a pump 47 and a motor 31. Two pump units may be located inside the housing 12 to allow for redundancy in case one unit fails.

The various parts of the actuator 10 are in communication with an electronics module (not shown). The electronics module may be in communication with a remote station (not shown), to receive power and communication signals therefrom.

In the preferred embodiment, the motor 31 is a brushless DC motor. Also, in the preferred embodiment the electronics module includes a battery to provide primary power to the motor and the solenoid. The battery is trickle-charged from a local power source or from the surface. Because of this, only a small cable is needed to provide power to the battery. Alternatively, primary power can be supplied from the remote station.

The hydraulic circuit is shown schematically in FIG. 4. A fluid line 42 connects the second chamber 15 with a variable volume fluid accumulator 44. A fluid line 45 connects the accumulator 44 with the intake side of a pump 47. A fluid line 36 connects the first chamber 13 with the pressure side of the pump 47. A one-way valve 34 is installed in fluid line 36, allowing fluid to only flow towards chamber 13.

To move the valve element 102 to its open position, the motor 31 is operated to drive the pump 47. The pump 47 will pump fluid from the accumulator 44 (through line 45) to the first chamber 13 of the actuator 10 to displace the piston 14 from its first position (FIG. 2) to its second position (FIG. 3). Because the actuator stem 16 abuts recess 105 in spring retaining plate, i.e., the spring actuating flange 110, it will move the spring retaining plate, and with it the valve stem 104, to open the valve.

Consequently, this will move valve stem 104, causing the valve element 102 to open. A pressure sensor may be arranged in fluid line 36 to shut off power to the motor 31 when the pressure has reached a predetermined level sufficient to drive the valve stem 106 against the power of spring 108. The one-way valve 34 ensures that the valve element 102 is held in the open position. Alternatively, a position sensor may be located in the actuator to stop the pump when the piston 14 has reached a predetermined position.

A control valve 39 (i.e., a bypass control unit) is located in an additional fluid line 48 (i.e., a fluid passage) that interconnects pressure line 36 (i.e. the first hydraulic line) with the accumulator 44. The control valve 39 is movable between a closed position which closes off fluid flow through line 48, and an open position which allows fluid flow through line 48 to thereby drain fluid from the first chamber 13 to the accumulator 44. A first force generating means, which in this embodiment is a solenoid 38, is arranged to move the control valve 39 between the open and closed positions.

When it becomes necessary to close the valve element 102, the solenoid 38 is operated to open control valve 39. This opens the fluid communication path from the first chamber 13 through lines 36 and 48 and to the accumulator 44. Since the pressure now is equalized on each side of the piston 14, the spring 108 will force the piston stem 16 backwards to its first position and the valve 100 will close as fluid is transferred to the second chamber 15 from the first chamber 13.

In the invention, means are arranged to minimize the forces needed to operate the control valve and to ensure a failsafe operation of the valve element 102. In a first embodiment of the invention a fluid line 49 connects the fluid line 36 with one side of control valve 39. When the valve element 102 is open, the pressure in fluid line 49 (which acts as a third force generating means) will act on one side, i.e. the first side, of the control valve 39 to push it towards its open position. On the other side of the control valve 39 is an adjusting spring 40 (which acts as a second force generating means) that acts on the other side, i.e. the second side, of the control valve 39 to push it towards its closed position. The adjusting spring 40 is adjusted so that the force acting on the second side is smaller than the fluid pressure from line 49 acting on the first side. The solenoid 38 will when energized also act on the second side of control valve 39, i.e. on the same side as the adjusting spring 40. In this way, the control valve 39 may be held in its closed position against the fluid pressure in line 49. If current to the solenoid is removed, as for example if the power supply fails, the pressure in line 49 will push the control valve 39 to its open position against the force of the adjusting spring 40 to drain the first chamber 13 of the actuator and close the valve element 102, as explained above. The use of the adjusting spring 40 will ensure that the difference in forces acting on the solenoid can be made very small and that therefore very little holding power will be required of the solenoid.

In an embodiment of the invention shown in FIGS. 5 and 6, the failsafe function is based on a holding electromagnet, i.e. a solenoid (which acts as the first force generating means). In this embodiment the control valve includes a housing (or casing) 50 having a first bore 52. One side of the first bore 52 is connected to a fluid line 49. In the first bore 52 is arranged a movable piston 54. A second bore 56 intersects the first bore 52 and is connected to fluid line 48 (FIG. 6). A lever or fulcrum 60 is at one end connected to the housing 50 with a hinge 61. The piston 54 abuts the lever at a point 65 near hinge 61. The piston 54 is biased by the spring 40 (i.e., the second force generating means) towards the closed position. As can be seen in FIG. 5, when lever 60 is in its "down" position, the movable piston 54 covers the second bore 56 and thus shuts off flow through fluid line 48. In this position the lever 60 is held by an electromagnet 62. If current to the electromagnet is shut off, pressure in line 49 (i.e., the third force generating means) will force the movable piston 54 upwards and uncover bore 56, thus opening flow through line 48 to accumulator 44. As described above, this will open the valve element 102.

Positioning the movable piston 54 near the hinge point of the lever 60 ensures that the holding force needed by the electromagnet 62 to hold the lever 60 in its "down" position can be made very small. Typically, the ratio between the two lengths may be somewhere between one in five (1:5) and one in ten (1:10), depending on the pressure rating of the pump and accumulator. This again depends on the well pressure (when the main valve is a valve on a Christmas tree) and, when this is a subsea accumulator, the depth of the seabed.

FIG. 7 discloses a second embodiment of the invention. Similar to the first embodiment described above, a motor is operated to drive the pump 47. The valve element 102 is operated between its open and closed position by different fluid pressure in hydraulic line 36 created by the pump 47. The pump 47 will pump fluid from the accumulator 44 to the first chamber 13 of the actuator 10 through fluid line 36 (i.e., a first hydraulic line) to displace the piston 14 from its first position (ref. FIG. 2) to its second position (ref. FIG. 3). In this second embodiment, the failsafe function is based on a solenoid 81, a lever 77 and a spring 71 operating the movable element, which in this case is a piston 70 movably positioned in a casing 75, e.g. a cylinder. The movable element 70 is held in its closed position by a first force generating means, i.e. the solenoid 81 amplified by the lever 77, and a second force generating means (i.e., the spring 71). Both the first (solenoid 81 and lever 77) and second (spring 71) force generating means bias the piston 70 to close the fluid passage 48. A third force generating means (i.e., pressurized fluid from the hydraulic line 36, 48) biases the movable element 70 to open the fluid passage 48.

In situations where it is desirable to hold or keep the fluid passage 48 open, one may apply a force on the lever 77 operating in an opposite direction of the solenoid 81 by the use of a permanent magnet 76. The permanent magnet 76 is adapted to apply a force large enough to override the force of the first and second force generating means.

When the fluid passage 48 is closed, the spring 71 and solenoid 81 and the lever mechanism 77 provide a greater force on the piston 70 than the force provided from the pressurized fluid on the other end of the piston 70. The piston 70 (and piston stem) is configured to float in the cylinder, e.g. the casing 75.

In use, a seal 72, e.g. an O-ring, is arranged at a circumference of the piston 70 when the fluid passage 48 is closed. The piston secures the seal 72 in place as the seal 72 provides a sealing function around the piston 70. A retainer element 73 is arranged inside the same casing 75 as the piston 70 in an abutting relationship relative the piston 70 and follows the movements of the piston 70 within the casing 75. In FIG. 7, a pre-tensioned spring 74 acts on the retainer element 73 and moves the retainer element 73 towards the piston 70. In this closed position of the fluid passage 48, the piston 70 closes off the fluid passage 48 through the control valve 82 to an outlet 79. However, when the fluid passage 48 is open, i.e. when the force from the third force generating means (i.e., pressurized fluid in line 36) is greater than the combined total force from the first and second force generating means (spring 71 and solenoid 81 and lever 77), the piston 70 is moved to an end position in the casing 75 (i.e. downwardly in FIG. 7), allowing fluid to exit the control valve 82 through the outlet 79. The function of the retainer element 73 is to hold the seal 72 in place when the passage is open (i.e. when the piston 70 is no longer holding the seal 72). The retainer element 73 may be a sleeve, axial extending fingers, or any other means performing the function of holding the seal 72 in place when the piston 70 is moved to the end position.

A compensator device 83 can be arranged in the hydraulic line 36 to maintain a constant pressure in the hydraulic line 36 and to mitigate any leaks.

The actuator can be made very small and compact. It may be releasable connected to the valve 100, making it easy to retrieve and replace for repairs or maintenance. The modularized arrangement also makes it possible to exchange this actuator with an all-electric actuator.

It should be recognized that, while the present invention has been described in relation to the preferred embodiments thereof, those skilled in the art may develop a wide variation of structural and operational details without departing from the principles of the invention as laid out in the attached claims. For example, the invention may be used with a pressure intensifier instead of a pump.

The invention claimed is:

1. An actuator for a valve in a subsea installation, the valve having a valve element which is movable between a first position and a second position and a spring which biases the valve element toward the first position, the actuator comprising:
   a hydraulic cylinder which includes a movable piston, the piston being mechanically connectable to said valve element;
   a fluid pump which is connected to said hydraulic cylinder through a first hydraulic line, said fluid pump being adapted to supply fluid to the hydraulic cylinder through the first hydraulic line at a sufficient pressure to move the piston and thereby move the valve element to the second position;
   a reservoir for storing a quantity of hydraulic supply fluid at a pressure that is less than said sufficient pressure;
   a second hydraulic line which provides a fluid passage between the first hydraulic line and said reservoir;
   a bypass control unit which is located in said second hydraulic line and which comprises a movable element that operates to open or close said fluid passage;
   first and second force generating means, both of which bias the movable element to a position to close the fluid passage; and
   a third force generating means which biases the movable element to a position to open the fluid passage, the third force generating means being configured to operate independently of both the first force generating means and the second force generating means.

2. The actuator according to claim 1, wherein during use the third force generating means comprises pressurized fluid from the first hydraulic line.

3. The actuator according to claim 2, wherein the first force generating means comprises a solenoid.

4. The actuator according to claim 3, wherein the second force generating means comprises a spring.

5. The actuator according to claim 1, wherein the movable element comprises a piston which is arranged in a casing.

6. The actuator according to claim 5, wherein the bypass control unit comprises a seal which is positioned around the piston when the fluid passage is closed and around a retainer element within the casing when the fluid passage is open, the retainer element being configured to retain the seal in position in the casing when the fluid passage is open.

7. The actuator according to claim 6, wherein the retainer element abuts the piston when the fluid passage is closed and follows the movements of the piston until a stop element on the retainer element comes into contact with a stop surface in the casing, wherein the fluid passage comprises an axial gap formed between the retainer element and the piston, which fluid passage extends through an outlet in the casing.

8. The actuator according to claim 6, wherein the retainer element abuts the piston when the fluid passage is closed and is adapted to follow the movements of the piston, and wherein the retainer element is formed with at least one radial through-going opening forming a part of the fluid passage when the fluid passage is open.

9. The actuator according to claim 1, wherein the second force generating means provides a force on the movable element which is greater than the force provided by the first force generating means on the movable element.

10. The actuator according to claim 1, wherein the third force generating means comprises pressurized fluid in a third hydraulic line which is connected to the second hydraulic line.

11. The actuator according to claim 1, wherein the control unit comprises a permanent magnet which is adapted to apply a force overriding the force of the first and second force generating means to thereby force the fluid passage open.

12. The actuator according to claim 1, wherein the bypass control unit is a two-way valve which includes the movable element.

13. The actuator according to claim 12, wherein the second force generating means comprises a spring which is adapted to move the movable element to close the fluid passage, and wherein the force of the spring is less than the force generated by the third force generating means.

14. The actuator according to claim 13, wherein, in a first position, a lever acts on the movable element to close the fluid passage and, in a second position, the lever enables the pressure in a third hydraulic line which is connected to the first hydraulic line to move the movable element to open the fluid passage.

15. The actuator according to claim 14, wherein the lever is held in the first position by an electro-magnet.

16. The actuator according to claim 1, wherein the fluid pump is driven by an electric motor.

17. The actuator according to claim 1, wherein the piston is releasably connected to the valve element.

18. The actuator according to claim 1, wherein the actuator further comprising a one-way valve in said first hydraulic line to enable fluid to flow in only one direction from the fluid pump to the hydraulic cylinder.

19. The actuator according to claim 1, wherein the actuator further comprises a fourth fluid line connecting said hydraulic fluid supply reservoir to the fluid pump.

* * * * *